Dec. 20, 1955
C. A. REES
2,727,551
LOCK NUT WITH DEFORMED CAP ASSEMBLY
Filed May 8, 1952
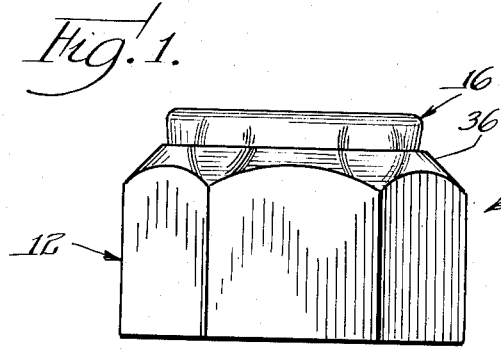
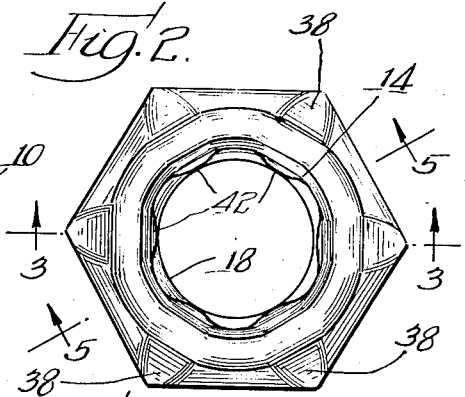
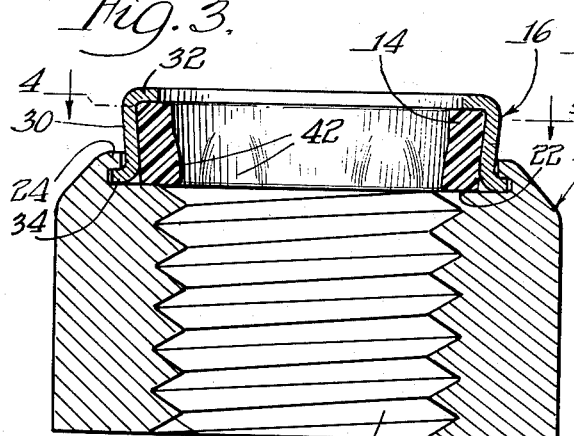
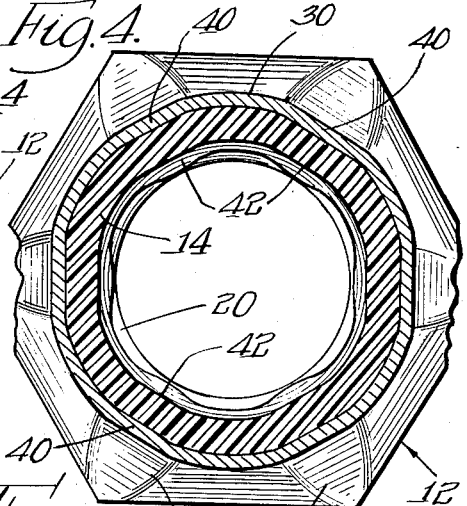
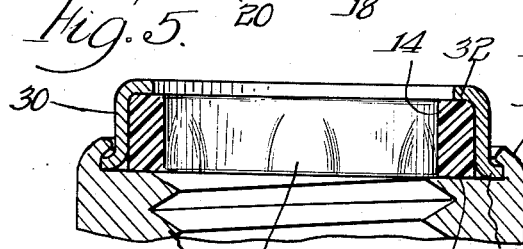
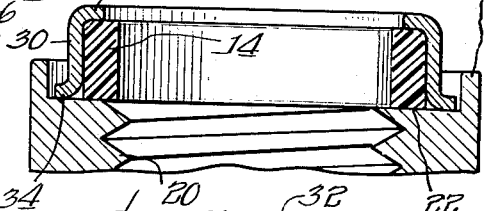
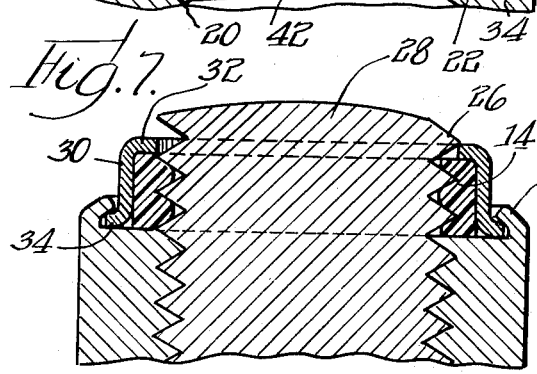
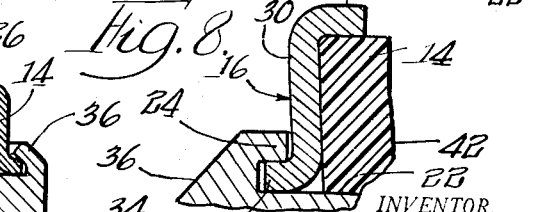
INVENTOR.
Clarence A. Rees
By: Moore, Olson & Trexler
attys.

United States Patent Office 2,727,551
Patented Dec. 20, 1955

2,727,551

LOCK NUT WITH DEFORMED CAP ASSEMBLY

Clarence A. Rees, Chicago, Ill., assignor to Illinois Tool Works, Chicago, Ill., a corporation of Illinois Application May 8, 1952, Serial No. 286,707

5 Claims. (Cl. 151—7)

The present invention relates to an improved locking device, and more specifically to a locking device of the type in which a nut carries a relatively soft locking sleeve, which is adapted to grip the threads of a complementary screw to lock the nut thereon.

Various means have been provided in the past in locking devices of the above described type for retaining the sleeve in preassembled relationship with the nut and for preventing relative rotation between the sleeve and the nut. In general, such means in the past have taken the form of a cap on the nut, which cap is of non-circular configuration and in which a sleeve having a similar configuration is disposed. Another method has been to provide the cap with teeth edges adapted to engage and hold the sleeve. These and other prior art means for retaining the sleeve have the disadvantage of being relatively difficult to make and to assemble, thereby making the prior art devices relatively expensive. It is, therefore, an object of this invention to provide an improved lock nut of the above described type which is of simple construction and which may be quickly and inexpensively manufactured.

A more specific object of this invention is to provide a novel and simple structure for assembling a locking sleeve with a nut and for restraining relative rotational movement between the sleeve and the nut.

Another object of this invention is to provide a novel method of manufacturing the improved locking device of this invention, wherein the nut, sleeve, and sleeve retaining cap are formed in one operation in a manner to retain them against relative displacement.

Other objects and advantages of the present invention will appear from the following description and the drawings, wherein:

Fig. 1 is a side elevation of a lock nut, involving the principles of this invention;

Fig. 2 is a plan view of the lock nut shown in Fig. 1;

Fig. 3 is a vertical cross section taken along line 3—3 in Fig. 2;

Fig. 4 is a horizontal cross section taken along line 4—4 in Fig. 3;

Fig. 5 is a partial vertical cross section taken along the line 5—5 in Fig. 2;

Fig. 6 is a partial vertical cross section similar to Fig. 5, but showing the parts in an intermediate stage of assembly;

Fig. 7 is a partial vertical cross section similar to Fig. 5 and showing a complementary screw element assembled with the locking device; and Fig. 8 is a fragmentary enlarged vertical cross section similar to Fig. 3.

Referring now more specifically to the drawings, wherein like parts are designated by the same numeral throughout the figures, the improved locking device of this invention, which is generally designated by the numeral 10, comprises a nut 12, a locking sleeve 14, and a cover 16.

While the nut 12 is shown in the drawings as a hexagonal nut having a central bore 18 defined by helical screw accommodating threads 20, this invention is equally applicable to nuts having a greater or lesser number of sides. As shown in Fig. 6, nut 12 is provided with an upper flat surface 22 extending radially from the bore. The flat surface is surrounded by an upstanding peripheral flange 24, which is for a purpose more fully described hereinbelow.

The annular locking sleeve 14 rests on the surface 22 of the nut 12. The sleeve 14 has an outside diameter which is sufficiently small to enable the sleeve to be disposed within and spaced from the upstanding flange 24 of the nut 12. The inside diameter of the annular sleeve 14 is less than the outer diameter of the threads 26 of the complementary screw element 28, as shown best in Fig. 7, so that the threads 26 will cut through the sleeve 14 when the screw is threaded through the nut. Thus, the sleeve will grip the screw threads 26 firmly and effectively restrain inadvertent relative movement between the sleeve and the screw. The sleeve 14 is preferably constructed of a relatively soft fibre material, but any other suitable material may be used which will similarly grip the screw.

The cover 16, which is constructed of sheet material, preferably metal, is provided with an upstanding annular wall 30, which, as shown in Fig. 6, has such a height relative to the height of the sleeve 14, that the upper or free end of the wall 30 may be turned inwardly to provide an annular flange 32 overlying the sleeve to retain the sleeve against axial displacement. The bottom end of the wall 30 terminates in an outwardly turned annular flange 34, which is for a purpose more fully described below. The flange 34 has an outside diameter of such size that it may be easily inserted within the upstanding flange 24 of the nut, as shown in Figs. 3, 5, 6, 7, and 8. The inside diameter of the annular wall 30 is such that the inner surface thereof fits the outer surface of the sleeve snugly to provide lateral support for said sleeve and to prevent lateral movement of the sleeve relative to the nut, which movement would cause the sleeve and the threaded bore 18 to become misaligned.

When assembling parts of the locking device of this invention, the parts are first disposed in the relationship shown in Fig. 6. The assembly shown in Fig. 6 is then subjected to a suitable swaging by a die or other suitable means not shown to deform the upstanding flange 24 of the nut over the outwardly turned flange 34 of the cover, thereby firmly clamping the flange 34 to the surface 22 of the nut 12, as shown best in Figs. 3, 5, 7, and 8. The cover 16 is preferably shaped so that the distance between the under surface of the flange 32 and the surface 22 of the nut 12 is slightly less than the height of the sleeve 14. This results in the sleeve 14 being firmly clamped to the surface 22 to provide a rigid and compact unit. As shown in the drawings, the above described swaging action results in the formation of the upper portion of the nut 12 and a portion of the upstanding flange 24 into a bevelled surface 36 surrounding the top of the nut.

It is a feature of my invention that during the above described swaging step, or as a subsequent step, the flange 24 of the nut is crimped or deformed radially inwardly at one or more areas 38 by the same die used to form the flanges 24 and 32, or by any other suitable means not shown. This crimping action of the flange 24 in turn simultaneously crimps the wall 30 of the cover 16, as at 40, which crimped areas of the wall are forced into the sleeve 14, causing the sleeve to be radially inwardly deformed, as at 42 (see Figs. 3, 4, and 8). Thus, the flange 24, the wall 30, and the sleeve 34 are simultaneously formed with radially aligned crimped areas, which crimped areas interlock these parts and effectively prevent any relative rotation between the nut 12 and the sleeve 14 during the application of a complementary screw element to the locking device. In addition, the inwardly deformed areas 42 of the sleeve will engage the complementary screw 28 with greater force than the remaining portions of the sleeve, thereby increasing the locking efficiency of the device. The crimped areas are preferably formed at the corners of the nut since the nut may be more readily deformed at these points. However, it is within the scope of this invention to form the crimped areas at any point or points around the periphery of the nut.

From the above description, it is seen that a simple, three-piece locking device has been provided, wherein the sleeve and the cover may be readily initially assembled with each other and with the nut without the need for first aligning interlocking surfaces, as would be necessary in the case where a sleeve and cover are of non-circular cross section, and wherein the parts may be readily simultaneously deformed after such initial assembly to provide a locking device wherein the parts are effectively held against relative displacement.

While the preferred embodiment of the present invention has been shown and described herein, it is obvious that numerous changes may be made without departing from the spirit and scope of the appended claims.

I claim:

1. A locking device, comprising a nut having a threaded bore with a predetermined maximum diameter similar to the outside diameter of a threaded shank to be applied to the locking device, a surface extending radially from said bore and upstanding flange means surrounding said surface, an annular locking sleeve of relatively soft deformable material disposed on said surface, said sleeve having an internal diameter less than the maximum diameter of said bore and less than the outside diameter of said shank so that the sleeve will grip and restrain retrograde movement of an applied shank, and a cover member having a wall surrounding said annular sleeve and extending downwardly within said upstanding flange means, inwardly turned flange means extending from an upper portion of said wall and overlying said sleeve to retain the sleeve against axial displacement, said flange upstanding means and the lower end of the wall of said cover each being deformed and providing a mutually interengaging flange connection to retain the cover and the annular sleeve on said nut; said upstanding means, wall, and annular sleeve having aligned interlocking substantially radially deformed areas, whereby relative rotation between said annular sleeve and said nut is prevented, and said sleeve having inner wall portions at said deformed areas projecting radially inwardly to increase the locking effectiveness of the sleeve.

2. A locking device, comprising a nut having a threaded bore with a predetermined maximum diameter similar to the outside diameter of a threaded shank to be applied to the locking device, a surface extending radially from said bore, and an upstanding flange means surrounding said surface, an annular locking sleeve of relatively soft deformable material disposed on said surface within said upstanding flange means, said sleeve having an internal diameter less than the maximum diameter of said bore and less than the outside diameter of said shank so that the sleeve will grip and restrain retrograde movement of an applied shank, and a sheet material cover member having a wall surrounding and supporting at least a portion of the exterior surface of said annular sleeve, inwardly turned flange means extending from an upper portion of said wall and overlying said sleeve to retain the sleeve against axial displacement, said wall extending downwardly to said surface within said upstanding flange means, said wall terminating adjacent its lower end in outwardly turned flange means having substantially the same cross sectional thickness as said wall, said upstanding flange means having a portion overlying and in engagement with said outwardly turned flange means of said wall to retain said cover and said annular sleeve on said nut, said upstanding flange means, wall, and annular sleeve having aligned interlocking radially inwardly deformed portions, whereby relative rotation between said annular sleeve and said nut is prevented, and said sleeve having inner wall portions at said deformed portions projecting radially inwardly to increase the locking effectiveness of the sleeve.

3. A locking device, as defined in claim 2, wherein the distance between said surface and said inwardly turned flange means being slightly less than the height of said sleeve, whereby said sleeve is slightly compressed between said surface and said flange means.

4. A locking device as claimed in claim 1, wherein said radially deformed areas are disposed at corners of said nut.

5. A locking device as claimed in claim 4, wherein the end portion of the nut adjacent the upstanding flange means and including the deformed areas at corners of the nut presents an inwardly beveled surface around the periphery thereof.

References Cited in the file of this patent

UNITED STATES PATENTS

| | | |
|---|---|---|
| 1,405,238 | Lovelace | Jan. 31, 1922 |
| 2,102,489 | Simmonds | Dec. 14, 1937 |
| 2,320,032 | Danforth | May 25, 1943 |
| 2,342,317 | Wikstrom | Feb. 22, 1944 |
| 2,351,057 | Luce | June 13, 1944 |
| 2,391,643 | Reutter | Dec. 25, 1945 |
| 2,442,067 | Williams | May 25, 1948 |
| 2,650,119 | Booth | Aug. 25, 1953 |

FOREIGN PATENTS

| | | |
|---|---|---|
| 461,638 | Great Britain | Feb. 22, 1937 |